US012664031B2

(12) United States Patent
Thomas et al.

(10) Patent No.: US 12,664,031 B2
(45) Date of Patent: Jun. 23, 2026

(54) POWER AND ENERGY OPTIMIZATION ACROSS DISTRIBUTED CLOUD ENVIRONMENT

(71) Applicant: INTERNATIONAL BUSINESS MACHINES CORPORATION, Armonk, NY (US)

(72) Inventors: Mathews Thomas, Flower Mound, TX (US); Utpal Mangla, Toronto (CA); Sai Srinivas Gorti, Irving, TX (US); Sharath Prasad Krishna Prasad, Flower Mound, TX (US); Venkatesh Ashok Rao Rao, Natick, MA (US); Praveen Jayachandran, Bangalore (IN); Eric Lee Gose, Dallas, TX (US); Juel Daniel Raju, Garland, TX (US); Amandeep Singh, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 17/970,023

(22) Filed: Oct. 20, 2022

(65) Prior Publication Data
US 2024/0134717 A1 Apr. 25, 2024
US 2024/0231954 A9 Jul. 11, 2024

(51) Int. Cl.
*G06F 9/50* (2006.01)
*G06F 1/32* (2019.01)

(52) U.S. Cl.
CPC .............. *G06F 9/5094* (2013.01); *G06F 1/32* (2013.01); *G06F 9/5083* (2013.01); *G06F 2209/505* (2013.01); *G06F 2209/508* (2013.01)

(58) Field of Classification Search
CPC ........ G06F 9/4862; G06F 9/4875; G06F 9/50; G06F 9/5044; G06F 9/505; G06F 9/5055;
(Continued)

(56) References Cited

U.S. PATENT DOCUMENTS 9,910,480 B2   3/2018   Klein
10,175,745 B2   1/2019   Mandagere
(Continued)

FOREIGN PATENT DOCUMENTS

JP       6641044 B2     2/2020

OTHER PUBLICATIONS

Fang, Chao, et al. "AI-Driven Energy-Efficient Content Task Offloading in Cloud-Edge-End Cooperation Networks". Sep. 14, 2022. IEEE Open Journal of the Computer Society. IEEE. vol. 3. pp. 162-171 (Year: 2022).*
(Continued)

*Primary Examiner* — Thomas J. Cleary
(74) *Attorney, Agent, or Firm* — Monchai Chuaychoo

(57) ABSTRACT

An approach for managing workload deployment in a distributed network, including edge computing is provided. The approach includes deploying several modules, such as, EMM (energy management module), LDM (localized deployment manager) and EDM (edge deployment manager). These modules will be constantly monitoring and managing the energy consumption at the edge nodes under their purview and communicate with other modules to develop a holistic energy management system (e.g., energy policies, energy algorithms, energy plans, etc.) to ensure the most effective energy management of workload is implemented.

20 Claims, 7 Drawing Sheets

(58) Field of Classification Search

CPC .... G06F 9/5083; G06F 9/5088; G06F 9/5094; G06F 11/3058; G06F 11/3062; G06F 1/32; G06F 1/329; G06F 2209/505; G06F 2209/508

See application file for complete search history.

(56) References Cited

U.S. PATENT DOCUMENTS

| | | | |
|---|---|---|---|
| 11,159,609 | B2 | 10/2021 | Mcgrath |
| 11,227,360 | B2 | 1/2022 | Koker |
| 2019/0056758 | A1 | 2/2019 | Weaver |
| 2021/0136142 | A1* | 5/2021 | Dong ..................... G06F 9/5094 |
| 2022/0091901 | A1* | 3/2022 | Billis .................. G06F 11/3495 |
| 2024/0095628 | A1* | 3/2024 | Mukherjee ......... G06Q 30/0206 |
| 2024/0231954 | A9* | 7/2024 | Thomas ................ G06F 9/5083 |
| 2025/0119346 | A1* | 4/2025 | Guo ..................... H04L 41/0813 |
| 2025/0278313 | A1* | 9/2025 | Chiba ..................... G06F 9/505 |

OTHER PUBLICATIONS

Chen, Haiming, et al. "Task partitioning and offloading in IoT cloud-edge collaborative computing framework: a survey". Dec. 3, 2022. Journal of Cloud Computing: Advances, Systems, and Applications. Springer Nature. (Year: 2022).*

"An Intelligent Method for Optimizing Edge System Layout and Management", An IP.com Prior Art Database Technical Disclosure, Authors et. al.: Disclosed Anonymously, IP.com No. IPCOM000267457D, IP.com Electronic Publication Date: Oct. 28, 2021, 7 pages.

"Intelligent Edge Analytics Distribution", An IP.com Prior Art Database Technical Disclosure, Authors et. al.: Disclosed Anonymously, IP.com No. IPCOM000269624D, IP.com Electronic Publication Date: Apr. 29, 2022, 4 pages.

"Method of Executing High-Utilization Distributed Workloads to Determine Maximum Power Consumption on Interconnected Computer Systems", An IP.com Prior Art Database Technical Disclosure, Authors et. al.: Disclosed Anonymously, IP.com No. IPCOM000202538D, IP.com Electronic Publication Date: Dec. 21, 2010, 6 pages.

Dabbagh et al., "Smart Energy Management in Data Centers", An IP.com Prior Art Database Technical Disclosure, IP.com No. IPCOM000246061D, IP.com Electronic Publication Date: Apr. 29, 2016, 10 pages.

Mell et al., "The NIST Definition of Cloud Computing", National Institute of Standards and Technology, Special Publication 800-145, Sep. 2011, pp. 1-7.

Rawas et al., "EEBA: Energy-Efficient and Bandwidth-Aware Workload Allocation Method for Data-Intensive Applications in Cloud Data Centers", IAENG International Journal of Computer Science, vol. 48, Issue 3: Sep. 2021, 14 pages.

Sun et al., "Eco-Friendly Powering and Delay-Aware Task Scheduling in Geo-Distributed Edge-Cloud System: a Two-Timescale Framework", IEEE Access, vol. 4, 2016, 17 pages.

Ku et al., "A collaborative cloud-edge computing framework in distributed neural network", ERASIP Journal on Wireless Communications and Networking (2020) 2020:211, 18 pages.

* cited by examiner

COMPUTER SYSTEM/SERVER

12

28

MEMORY

34

STORAGE SYSTEM

30

RAM

CACHE

32

40

42

16

PROCESSING UNIT

18

20

NETWORK ADAPTER

22

I/O INTERFACE(S)

24

DISPLAY

14

EXTERNAL DEVICE(S)

10

POWER AND ENERGY OPTIMIZATION ACROSS DISTRIBUTED CLOUD ENVIRONMENT

BACKGROUND

The present invention relates generally to the field of distributed networks, and more particularly to managing workload in a distributed network.

The recent trend of edge computing extends cloud computing and the Internet of Things (IoT) to the edge of the network. Edge computing moves more computational power and resources closer to end users by increasing the number of endpoints and locating them nearer to the consumers—be they users or devices. Thus, power consumption by edge computing is going to be critical. This is due to the fact that edge devices are limited in their power store and this has been a key factor in preventing successful edge deployments.

SUMMARY

Aspects of the present invention disclose a computer-implemented method, a computer system and computer program product for power optimization across edge components in an edge environment. The computer implemented method may be implemented by one or more computer processors and may include: receiving, by an EDM (Edge Deployment Manager), an initial request associated with a deployment of one or more services and/or one or more workload applications and one or more energy policies; determining, by the EDM, whether to fulfil the initial request or send the initial request to a LDM (localized deployment manager); in responsive to having determined to send the initial request to the LDM, sending, by the EDM, the initial request to the LDM; determining, by the LDM, an initial energy characteristic and initial energy consumptions across the edge environments, wherein edge environments comprise of one or more edge locations; creating an initial energy plan of one or more energy plans, by the LDM, based on the initial energy characteristics, initial energy consumptions and inputs from a first EMM (energy management modules) of one or more EMMs; storing the initial energy plan of one or more energy plans at a first edge node of the one or more edge nodes, wherein the one or more workload applications is deployed; monitoring, by a first EMM, subsequent energy characteristics of the first node; creating, by the first EMM, a subsequent energy plan of one or more energy plans associated with the first node; managing, by the first EMM, the power optimization across the first edge node of the one or more edge nodes based on the subsequent energy plan of one or more energy plans and the one or more energy policies; and updating, the subsequent energy plan of one or more energy plans based on changes to energy consumptions and subsequent energy characteristics associated with the first node.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions.

The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
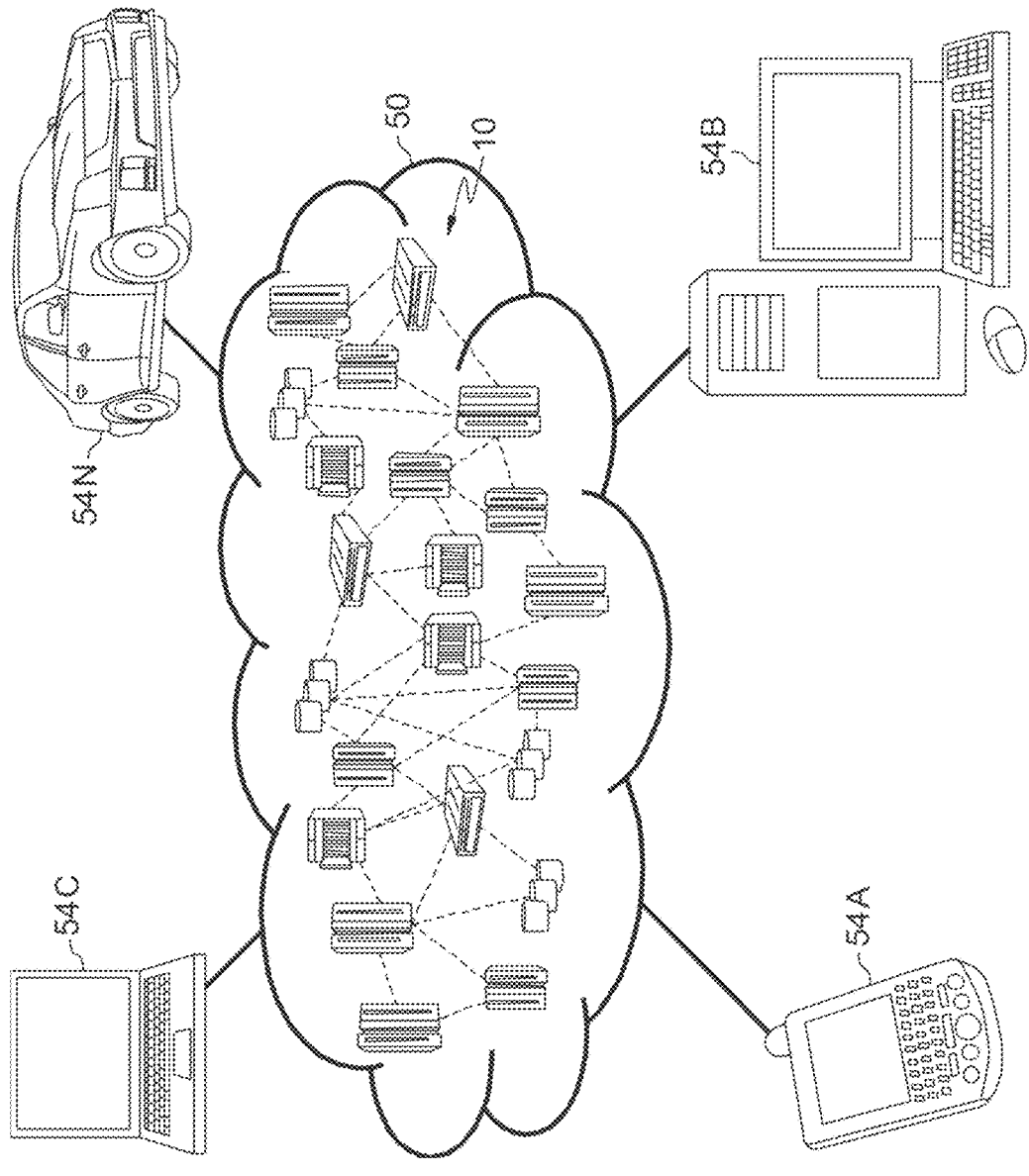
FIG. 1 depicts an embodiment of a cloud computing environment (also called the "first embodiment system") according to the present invention.

With respect to edge computing, power consumption will be one of the major factors that will determine what can run at the edge especially given the small form factor of edge devices. Therefore, it is important to look at power holistically. For example, an edge node may have sufficient power to run its own processes, but it may be dependent on data from another edge node which does not have sufficient power. Thus, in order to succeed in a planned deployment of workloads, there is a need to include the power consumption as part of fundamental plan on workload deployment.

Currently solutions examine this problem from the perspective of a specific workload running on specified HW (hardware) in a data center, but the situation becomes exponentially more complex with all the different nodes in an end-to-end edge-computing environment within the context of a solution. Thus, it is therefore essential to ascertain a workload deployment across all the nodes from an end-to-end solution perspective and the impact it has on power consumption.

Embodiments of the present invention provides an approach for managing workload deployment in a distributed network, including edge computing. The approach includes deploying several modules, such as, EMM (energy management module), LDM (localized deployment manager) and EDM (edge deployment manager). These modules will be constantly monitoring and managing the energy consumption at the edge nodes under their purview and communicate with other modules to develop a holistic energy management system to ensure the most effective energy management of workload is implemented.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model may include at least five characteristics, at least three service models and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage, deployed applications and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure that includes a network of interconnected nodes.

Embodiments of the present invention will now be described in detail with reference to the Figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

FIG. 1 illustrates a cloud computing environment according to an embodiment of the present invention. As shown, illustrative cloud computing environment 50 comprises one or more cloud computing nodes 10 with which local computing devices used by cloud consumers, such as, for example, personal digital assistant (PDA) or cellular telephone 54A, desktop computer 54B, laptop computer 54C and/or automobile computer system 54N may communicate. Computing nodes 10 may communicate with one another. They may be grouped (not shown) physically or virtually, in one or more networks, such as Private, Community, Public or Hybrid clouds as described hereinabove or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
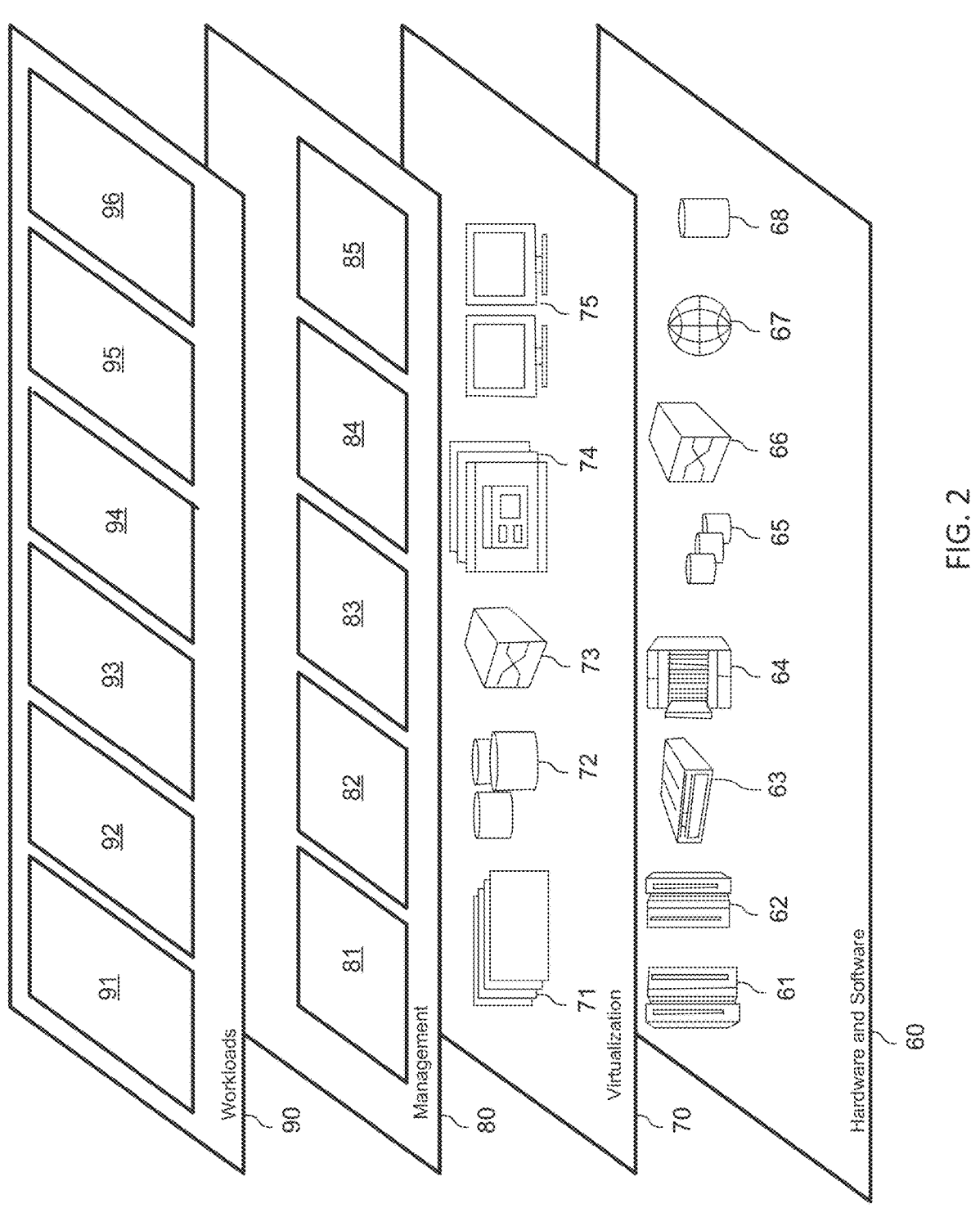
FIG. 2 depicts abstraction model layers used in the first embodiment system.

FIG. 2 illustrates abstraction model layers according to an embodiment of the present invention and comprises a set of functional abstraction layers provided by cloud computing environment 50 (FIG. 1). It should be understood in advance that the components, layers and functions shown in FIG. 2 are intended to be illustrative only and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85, provide pre-arrangement for and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and power management 96. Power management 96 implements the functions described above to integrate power consumption across edge components when deploying and managing workloads related to an edge node from an end-to-end solution perspective.

Functionality and subcomponents of power management 96 will be described in greater details as it relates to FIG. 4. However, the following are some key characteristics of power management 96: i) energy management across edge nodes of all the required compute nodes. For example, a solution may need 5 edge nodes to run end-to-end and 4 of these nodes may have sufficient power but fifth does not. The embodiment will determine what the best option is in this case (e.g., prioritize which solution to implement and disable other solutions that are not priority to deploy, move application to another node, deploy less energy consuming models/algorithms to node of concern etc.); ii) can anticipate future needs and readjust the workloads to be deployed; iii) determine solutions by identifying what the power consumed based on associate energy descriptions for individual workloads. For example, a solution workload identifies the net energy needed to run the end-to end solution; iv) dynamically modify power consumption (by switching algorithm) and reduce the load on the edge node based on each edge node associate application usage, its energy needs.

Furthermore, the high level steps of the workflow interaction for power management 96 is as follows:

1. EDM (Edge Deployment Manager) will monitor all requests coming in and fulfilling/delegating to respective LDMs (Localized Deployment Managers).
2. LDMs will identify the best node and deploys the requested application to it.
3. An energy plan will be created for all components and solutions deployed to identify the optimized method of deploying components.
4. EMM (Energy Management Module), located on the nodes, manages the energy consumption across the nodes. The EMM can utilize an energy characteristic. An energy characteristic is created which has information that captures the energy requirements of all the components. It is noted that an edge node can be a far edge device or edge cluster. It is also noted that an application is the end solution to be deployed and run on the node.

Figure 3:
FIG. 3 depicts a cloud computing node used in a first embodiment of a system according to the present invention.

FIG. 3 illustrates a cloud computing node according to an embodiment of the present invention. In example cloud computing node 10, is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set of one or more program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
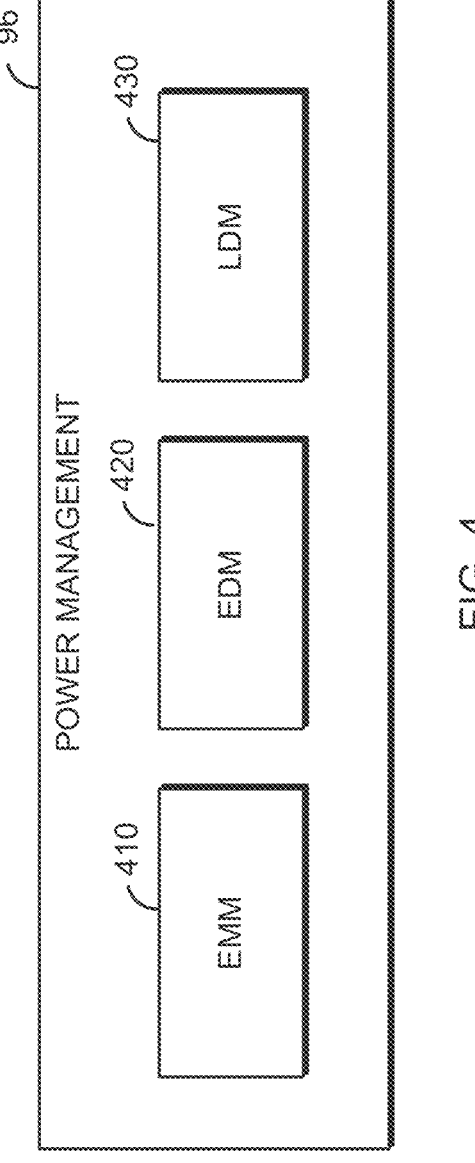
FIG. 4 illustrates a functional block diagram of a power management 96, in accordance with an embodiment of the present invention.

FIG. 4 illustrates a functional block diagram of a power management 96, in accordance with an embodiment of the present invention. In the depicted embodiment, power management 96 contains several submodules such as, but is not limited to EMM 410, EDM 420 and LDM 430.

As is further described herein below, EDM 420 that has the capability of monitoring and managing any requests to deploy solution/application workloads across edge nodes. This acts as Edge Deployment Manager and can reside on cloud environment or on-premises. EDM can either deploy the application to the edge node of a specific data center or can decide which local deployment manager to send this request based on the energy plan and energy characteristics of the application requested (see arrow 551 of FIG. 5B). Considering the energy plan information from all the data centers which is constantly updated as when changed, EDM's will look at the end-to-end solution scenario using the energy plan and can deploy directly to any locations/data centers connected to the central site if needed in cases that the localized deployment manager is inaccessible.

As is further described herein below, EMM 410 manages energy consumption across each node. Energy management modules (EMM) will be distributed across the edge nodes which have limited power sources and manage small workloads to a data center or cloud environment which will have greater power sources including backup sources. These modules will be constantly monitoring and managing the energy consumption at the edge nodes under preview and communicate with other modules to develop a wholistic energy management system to ensure the most effective energy management when workload deployment is implemented from an end-to-end solution perspective.

Other characteristics of EMM 410 can include, but it is not limited to, i) EMM's utilize the Energy Characteristics and communicate with EMM's of other nodes to ensure effective energy management, ii) EMM's can request the deployment manager to change/deploy algorithms for the same application when there is a shortage of energy, power and resources on the edge node and iii) when the consumption of resources on a node is too high, EMM on that node can communicate with EMM's on other nodes (see arrow 554 of FIG. 5B) and ask those nodes to send a request to LDM/EDM for some of those workloads so that workload on the nodes is balanced. Considering the end-to-end solution this relocation of workloads is done by ensuring that the solution runs effectively on all required number of nodes. The energy plan is updated accordingly after the relocation.

As is further described herein below, LDM 430 manages deployment of workloads to the data center or to individual edge nodes. An LDM is assigned to each Data center or specific edge location. This is to ensure decentralized deployment in cases that central EDM is down, LDM's can receive requests and deploy applications independent to EDM. Each location can consist of multiple edge nodes including Edge Clusters, Edge Devices and IoT devices. When there is a request to deploy certain workload to Edge Nodes, LDM will look for the energy plan of all the nodes in the respective location and energy characteristics of the solution to be deployed from an end-to-end solution perspective (see arrow 552 of FIG. 5B). Taking all of these conditions into consideration, LDM will create an Energy Plan that ensures optimized energy utilization at the edge node where the application is getting deployed. This energy plan will take current energy needs of all the edge nodes and energy characteristics of all the components into consideration and will generate the best optimized plan. Once the energy plan is created, LDM will deploy the workload to respective edge node and will also share the energy plan with the edge node (see arrow 553 of FIG. 5B). When some workloads are already deployed on the edge nodes within a location and the energy requirements to fulfill next solution request considering the end-to-end solution perspective is not sufficient, an LDM can communicate with other LDM's to deploy workloads on a different location if and when needed.

The following are important concepts and/or terminologies (e.g., energy plan, energy characteristics, edge nodes and workload application) that will be useful to understand the invention:

Energy Plan:

Energy plan consists specific energy requirements for each component and workload that is deployed across the nodes. An energy plan will be created for each component and solution deployed across the nodes. Each edge node will have its own energy plan of what's deployed and how the energy is consumed by these components. These plans will be dynamically updated as the situation changes and will include predictive, bias detection and other models which will ensure future energy needs are accounted for, models are accurate etc. These energy plans when updated are shared with LDM as well as EDM. It is noted that there is an interaction between energy policy and energy plan. For example, if an energy policy initiates a change to the energy consumption mode that could potentially alter the energy plan of how energy is actually going to be consumed.

Energy Characteristic:

Each component (HW, application, edge nodes) will have an energy characteristic associated with it. This will be a characteristic associated with the device similar to configuration characteristics we commonly associate with devices such as memory, CPU, and storage. Certain applications will vary in energy used based on its load and this will be reflected in the energy characteristic. In addition, the energy characteristics is also associated with and end-to-end solution. A given solution may, for example, consist of 5 applications which need to be distributed across 3 nodes. The energy characteristics will reflect this including the power required for each node which may vary based on solution workload.

Energy Policies:

Energy policy provides a guidance for an action that each EMMs can take, such as, but is not limited to, turning off/on or changing to a different energy consumption mode if running low on power. EMMs can use the energy policy and dynamically implement those changes on the edge node to be able to better serve the end-to-end solution deployment. Each EMM has policies (along with energy characteristic) that allows it to govern/manage its energy consumption and usage. An example of an energy policy can include, if an application consumes too much power, then EMM can utilize another algorithm and/or interact with an EDM to deploy a new energy algorithm. It is noted that there is an interaction between energy policy and energy plan. For example, if an energy policy initiates a change to the energy consumption mode that could potentially alter the energy plan of how energy is actually going to be consumed.

Energy Algorithm:

A set of guidance/instructions that allows each application to perform/fulfil its primary purpose (e.g., file manager application, workload applications, etc.) but will also have performance indicators. The performance indicators will help shape energy policies. Each algorithm is specific to each application but an application may have multiple energy algorithms associated with the application. Each edge node in coordination with the EMM can decide if it needs to change the algorithms to save power if the application workload is consuming too much power in the context of the full solution. For example, one algorithm may consist of utilizing CPU instead of GPU for inferencing, reducing the input (e.g., number of images) for training the model to save power, etc.

Edge Nodes:

Edge nodes can be either edge device, an edge cluster or an IoT device linked to a specific location or data center. Each edge node will have its own compute resources and hardware supporting it to deploy workloads suitable for it. Each edge node will have its own energy characteristics, energy plan and EMM to ensure proper deployment and effective maintenance of energy/power consumption. Each edge node within a location/data center will be in a bi-directional communication with other edge nodes to ensure proper communication so that when needed can edge nodes can switch transmission modes, they can request other nodes to deploy workloads to manage workloads across the nodes.

Workload Application:

Workload application is the end solution to be deployed on the edge node. One or multiple applications put together can be used to fulfill an end-to-end solution to be deployed at the edge. Each application will have its own energy characteristic on how much power it needs and how many components/hardware/resources it needs. Each application is designed in such a way that it will have couple of different algorithms that the application can be changed to reduce power consumption if and when needed. These different algorithms vary based on the application and what it's supposed to do, but it could be something like utilizing CPU instead of GPU for inferencing, reducing the input (e.g.: number of images) for training the model to save power etc.

Figure 5A:
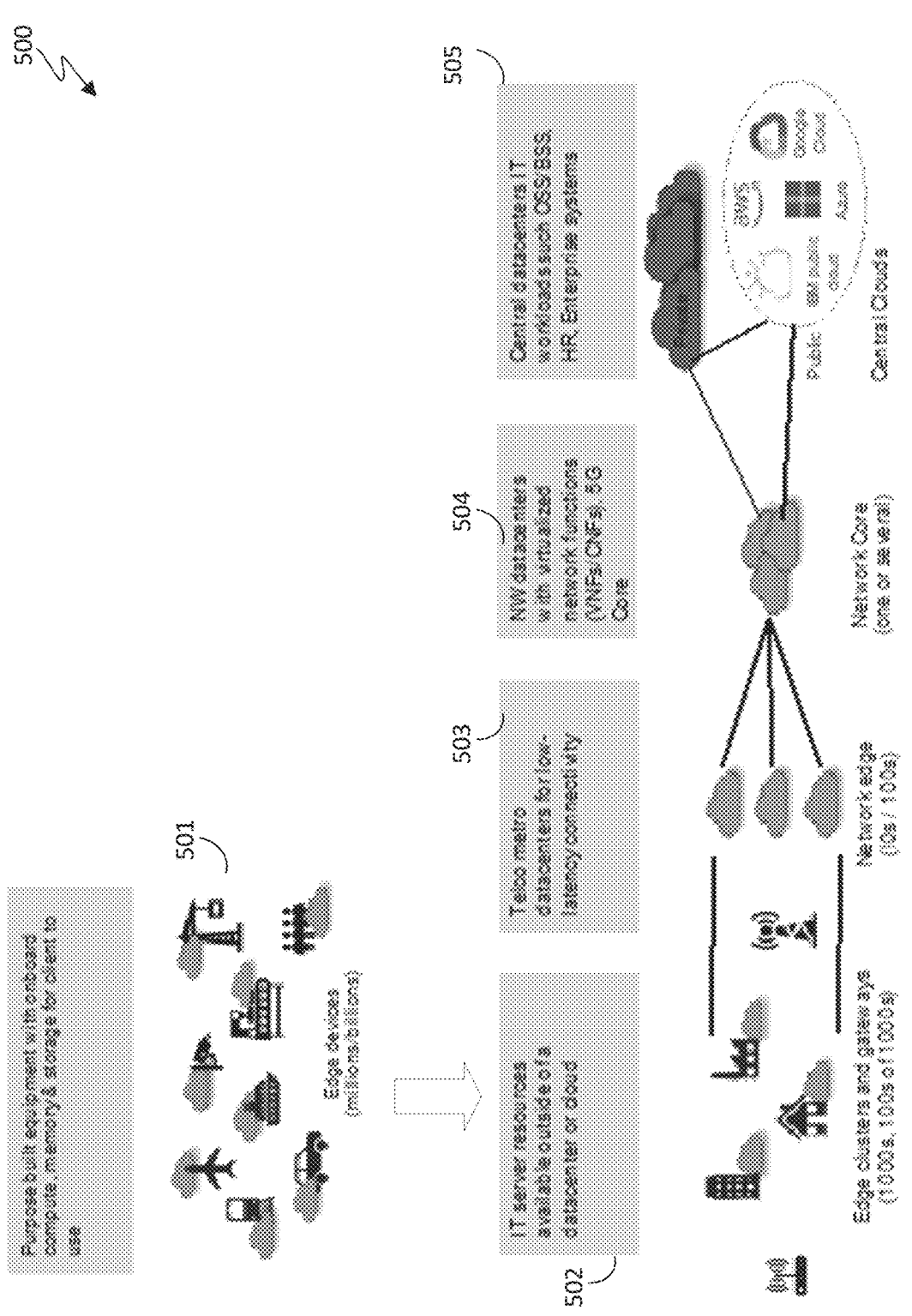
FIG. 5A depicts one use case scenario on how the first embodiment system of the present invention can be utilized. The diagram illustrates a sample end-to-end edge deployment with various nodes deployed.

FIG. 5A depicts a sample end-to-end edge deployment, designated as 500, with various nodes deployed from the far edge 501 (i.e., devices at left top of the drawing) towards central data centers 505 (i.e., could be in public cloud or in enterprise). There are two examples to illustrate:

Initial Deployment:

When an initial deployment starts, the EDM (i.e., 420) at the central data center 505 will interact with the EMM (i.e., 410) determine what can be deployed given current and predicted power availability for a given solution. In doing so, it will look at the energy characteristics of each application (501, 502, 503 and 504) and the end-to-end energy characteristics of the solution. It will then create an Energy plan for the specific deployment.

Runtime:

Several things may happen pertinent to the solution deployed above (i.e., from initial deployment), wherein the Energy Plan is updated as conditions change or the energy characteristics may also be updated based on new information. Furthermore, EMM's will monitor the nodes that they manage and ensure that the energy policies for each node are managed. For example, a given application may be consuming too much power as it an algorithm running of the node is power intensive. Therefore, the EMM will there instruct the node to use another algorithm or interact with the edge deployment manger to deploy a new algorithm.

EMM's will interact with additional EMM's to modify data transmission between nodes based on power consumption and distributing and recipient nodes.

As significant blocks in a solution are impacted by power consumptions, EMM's will interact with each other. A decision will be made by the node requesting the solution (e.g., if the entire solution should be brought down or phase it down to lower SLA while still keeping the solution running).

Figure 5B:
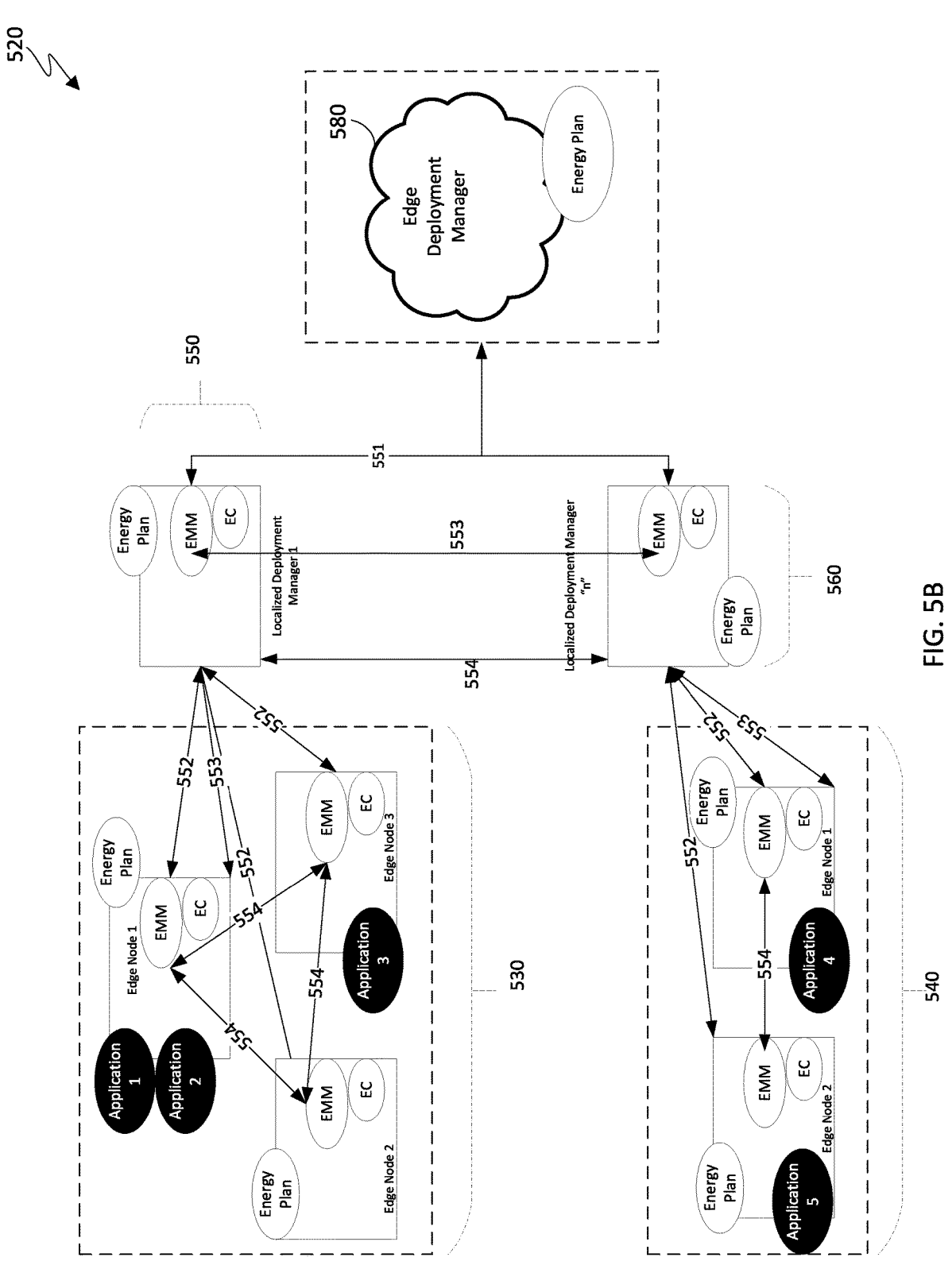
FIG. 5B depicts details on how the various modules and/or components interact with each other as part of the functionality of the first embodiment system of the present invention.

FIG. 5B, designated as 520, depicts details on how the various modules and/or components (e.g., Energy Plan, EMM, EC, Edge Nodes, LDM and EDM) interact with each other as part of the functionality of the first embodiment system of the present invention.

The following is an example flow of the implementation with more details:

Deployment Flow:

1. EDM (580 of FIG. 5B) will receive input to deploy a specific service or application.
2. EDM can either fulfill or will send this request (see arrow 551 of FIG. 5B) to one or more LDMs (e.g., 550 or 560) to deploy depending on the energy plan of the data centers. It is noted that the number of LDMs can vary from just one (i.e., 550) to "n" (see diagram where 560 is the "n$^{th}$" LDM).
3. The LDMs (see arrow 552 of FIG. 5B) will look at the energy characteristic of the solution (e.g., power/energy, hardware requirements needed etc., from an end-to-end perspective). It will have inputs from all the EMM's (e.g., from edge location one 530 and edge location two 540) on all the nodes in that specific data center. Based on all these parameters an energy plan is created on what and where to deploy the solution (see arrow 553 of FIG. 5B) considering the future needs of the nodes. This energy plan is stored with the node where the application is deployed.
4. Each node (e.g., within edge location one 530, within edge location two 540, etc.) will have an energy plan that describes the current power consumption, applications deployed and potential applications that can be deployed under different situations.

Runtime Flow:

1. Once the application is deployed to a specific edge node, several things can happen to ensure optimized Power management.
2. Energy plan is shared and updated as conditions change across the nodes.
3. EMM's on each node will constantly monitor its energy characteristics and energy policies and manage energy consumption.
4. As conditions change (e.g., workload application running might require additional resources etc.,) energy characteristics will be updated and EMM monitors these changes and can do one or more things below:

A. If the power consumption is too high (see arrow 554 of FIG. 5B):

1. See if an algorithm can be updated with the one that uses less energy and update it dynamically.
2. If running low on power turn on, off or move to a different energy consumption mode and change the data transmission signal accordingly.
3. Look for any workloads that are no longer required and un-deploy those workloads.
4. Identify any physical attributes that can be changed to use less energy.
5. EMM's will interact between nodes and see if any other nodes can run this workload based on energy plan.

B If change in power consumption is not too significant:

1. Predict future energy needs for a given node and update the energy plan so that appropriate workloads are deployed.
2. See if data transmission between nodes or to the central location can be optimized so that only required data is transmitted and saving the bandwidth.
4. Based on the current energy consumption and the energy characteristic for all the components and solutions, an energy plan is created that will optimize the energy consumption across the nodes. This Energy plan will be dynamically updated as the situation changes and when more EMM's transmit details about each node.

It is noted that algorithm(s) mentioned above can be customized based on deployment requirements and/or runtime requirements. Thus, not all users will have the same algorithm(s) and each module (e.g., EMM, LDM, EDM, etc.) can have independent algorithm. At the same time, if there are separate algorithms on each module, they can be programmed to collaborate together to achieve specific requirement of the user (e.g., energy efficient, maximum workload throughput, etc.).

Figure 6:
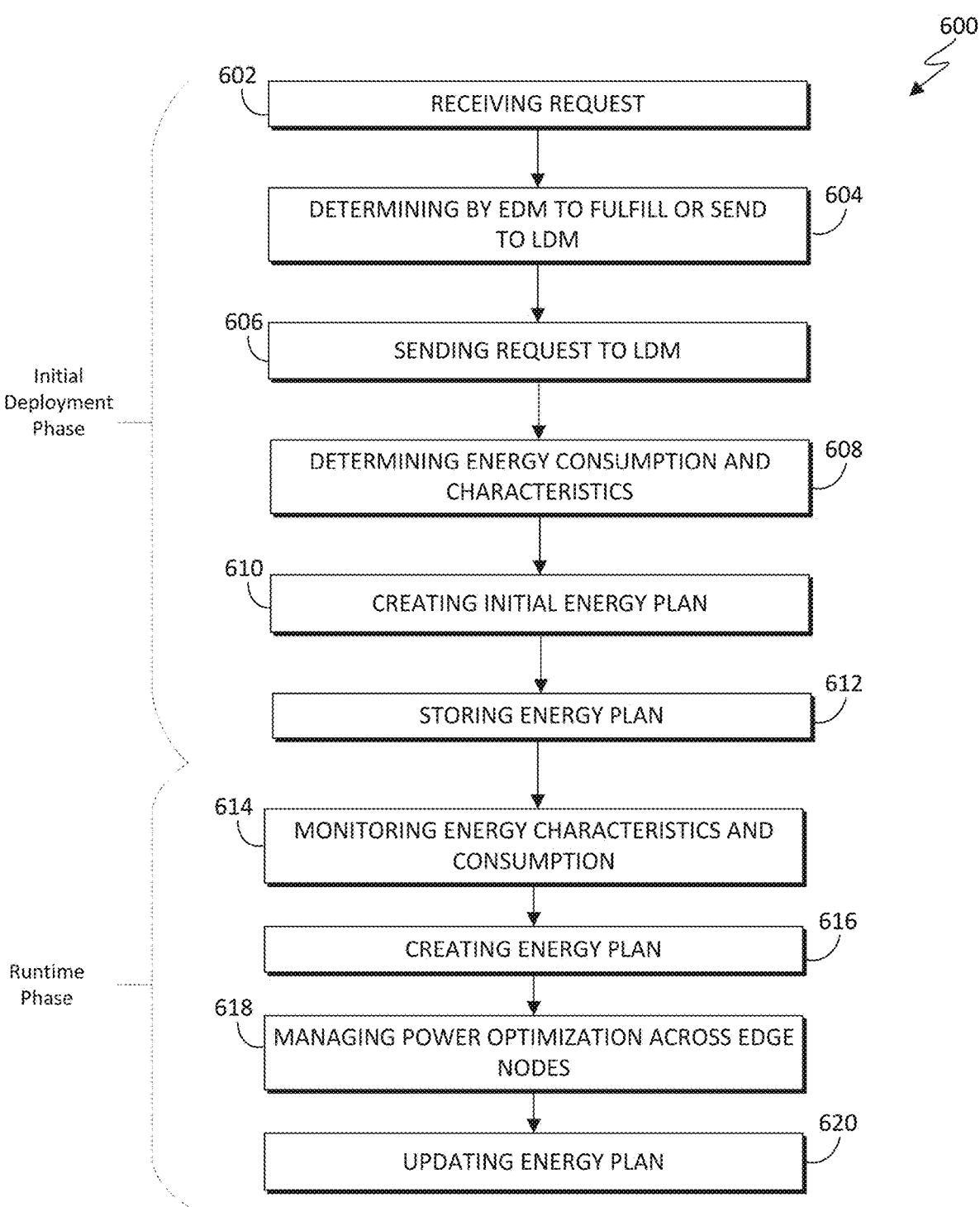
FIG. 6 is a high-level flowchart illustrating the operation of power management 96, designated as 600, in accordance with an embodiment of the present invention.

FIG. 6 is a high-level flowchart illustrating the operation of power management 96, designated as 600, in accordance with an embodiment of the present invention.

The flowchart can be segmented into two phases for ease of understanding. For example, steps 602 to 616 can be viewed as initial deployment phase/flow and steps 616 to 624 can be viewed as runtime phase/flow.

Power management 96 receive an initial request associated with a deployment of one or more services and/or one or more application (step 602). Power management 96, via EDM, can monitor all requests in and fulfill/delegate to respective localized deployment managers. In addition, other data and information may be included and/or created during this phase. For example, energy policies and energy algorithm, which could be predetermined by a user but can eventually change based on future need of the user.

Power management 96 determines whether to fulfill the initial request or send the initial request to the LDM (localized deployment manager) (step 604). As previously mentioned in step 602, the DM can monitor all requests in and fulfill/delegate to respective localized deployment managers.

Power management 96 send the initial request to the LDM, (step 606). The EDM has determined that it is optimal (e.g., based on status, such as, idle, busy of various LDM or the EDM is busy with other request, etc.) to send the request to the LDM (see FIG. 550 of FIG. 5B).

Power management 96 determines an initial energy characteristic and initial energy consumptions across the edge environments (step 608). Power management 96, via EDM, will assess the energy characteristic of the solution, such as, but is not limited to, power/energy, hardware requirements needed etc., from an end-to-end perspective. The LDM will have inputs from all EMMs on all the nodes in that specific data center.

Power management 96, by the LDM, creates an initial energy plan based on the initial energy characteristics, initial energy consumptions and inputs from the EMMs (from previous step) (step 610). The initial energy plan can contain what and where to deploy the solution considering the future needs of the nodes.

Power management 96 stores the initial energy plan of one or more energy plans at a first edge node, wherein the one or more applications is deployed (step 612). The point of having and storing an individual energy plan for each node (see FIG. 5B) is that each node is unique. Thus, each node will have a unique (i.e., customized) energy plan that describes the current power consumption, applications deployed and potential applications that can be deployed under different situations for that particular node. It is noted that other edge nodes may have their own energy plan (i.e., created by the LDM) simultaneously as the first node.

Power management 96 monitors the subsequent energy characteristics of the first node (step 614) after deployment. Thus, during run time phase, the EMM on each node will constantly monitor its energy characteristics and energy policies and manage its own energy consumption. Additionally, the energy plan for one node may be shared with other edge node's EMM.

Power management 96 creates a subsequent energy plan of associated with the first node (step 616). Based on the current energy consumption and the energy characteristic for all the components and solutions, an energy plan is created that will optimize the energy consumption across the node. This "subsequent" energy plan will be dynamically updated as the situation changes and when more EMM's transmit details about each node.

Power management 96 manages the power optimization across the first edge node (step 618). As conditions change (e.g., workload application running might require additional resources etc.) energy characteristics will be updated and EMM monitors these changes can perform the following action based on whether the power consumption is too high or not significant. For example, if the power consumption is too high, the EMM can change an existing algorithm to use less energy or see if another node can perform this workload instead. In another example, if the energy consumption is not too significant then the energy plan may be updated with future energy needs based on a prediction.

Power management 96 updates the subsequent energy plan based on changes to energy consumptions and changes to energy characteristics associated with the first node (step 620). The energy plan can be dynamically updated as the situation changes and when more EMMs transmit details about each node to other EMMs.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for power optimization across edge components in an edge environment, wherein the edge environment comprise of one or more edge nodes, the computer-implemented method comprising:

receiving, by an EDM (Edge Deployment Manager), an initial request associated with a deployment of one or more services and/or one or more workload applications and one or more energy policies, wherein the EDM is configured to monitor and manage requests across one or more edge nodes;

determining, by the EDM, whether to fulfil the initial request or send the initial request to a LDM (localized deployment manager), wherein the LDM is configured to manage deployment of the one or more workload applications and the LDM is assigned to one or more edge locations and the LDM is configured to communicate with the EDM, one or more EMMs (energy management module) to ensure an effective energy management of workload;

in responsive to having determined to send the initial request to the LDM, sending, by the EDM, the initial request to the LDM;

determining, by the LDM, an initial energy characteristics and initial energy consumptions across edge environments, wherein edge environments comprise of the one or more edge locations;

creating an initial energy plan of one or more energy plans, by the LDM, based on the initial energy characteristics, initial energy consumptions and inputs from a first EMM (energy management modules) of the one or more EMMs;

storing the initial energy plan of one or more energy plans at a first edge node of the one or more edge nodes, wherein the one or more workload applications is deployed;

monitoring, by a first EMM, subsequent energy characteristics of a first node;

creating, by the first EMM, a subsequent energy plan of one or more energy plans associated with the first node, wherein the one or more energy plans consisting of energy requirements for each hardware component associated with each of the one or more edge nodes and the one or more workload applications that is deployed across the edge environments;

managing, by the first EMM, the power optimization across the first edge node of the one or more edge nodes based on the subsequent energy plan of one or more energy plans and the one or more energy policies; and dynamically updating, the subsequent energy plan of one or more energy plans based on changes to energy consumptions and subsequent energy characteristics associated with the first node, wherein the one or more energy plans contains one or more energy models and the one or more energy models have been trained to save power.

2. The computer-implemented method of claim 1, further comprising:

monitoring, by a second EMM, a second energy characteristics of a second edge node;

creating, by the second EMM, a second energy plan of one or more energy plans associated with the second edge node;

managing, by the second EMM, the power optimization across the second edge node of the one or more edge nodes based on the second energy plan of one or more energy plans; and updating, the second energy plan of one or more energy plans based on changes to second energy consumptions and the second energy characteristics associated with the second edge node.

3. The computer-implemented method of claim 1, wherein the one or more EMMS is configured to utilize energy characteristics and communicate with other EMMS of the one or more EMMs to ensure effective energy management.

4. The computer-implemented method of claim 1, wherein the initial energy characteristics is an electrical requirement for each hardware, application and edge node components deployed across the edge environments.

5. The computer-implemented method of claim 1, wherein the one or more workload applications is an end solution associated with one or more software applications to be deployed on the one or more edge nodes.

6. The computer-implemented method of claim 1, wherein the one or more energy policies further comprises one or more energy algorithm and the one or more energy policies provide guidance for the one or more EMMs to take action wherein the action includes, turning off or changing different energy consumption mode if running low on power.

7. The computer-implemented method of claim 6, wherein the one or more energy algorithm further comprises of utilizing a CPU instead of GPU for inferencing and reducing the input for a training a model to save power.

8. A computer program product for power optimization across edge components in an edge environment, wherein the edge environment comprise of one or more edge nodes, the computer program product comprising:

one or more computer readable storage media having computer-readable program instructions stored on the one or more computer readable storage media, the program instructions executes a computer-implemented method comprising steps of:

receiving, by an EDM (Edge Deployment Manager), an initial request associated with a deployment of one or more services and/or one or more workload applications and one or more energy policies, wherein the EDM is configured to monitor and manage requests across one or more edge nodes;

determining, by the EDM, whether to fulfil the initial request or send the initial request to a LDM (localized deployment manager), wherein the LDM is configured to manage deployment of the one or more workload applications and the LDM is assigned to one or more edge locations and the LDM is configured to communicate with the EDM, one or more EMMs (energy management module) to ensure an effective energy management of workload;

in responsive to having determined to send the initial request to the LDM, sending, by the EDM, the initial request to the LDM;

determining, by the LDM, an initial energy characteristics and initial energy consumptions across edge environments, wherein edge environments comprise of the one or more edge locations;

creating an initial energy plan of one or more energy plans, by the LDM, based on the initial energy characteristics, initial energy consumptions and inputs from a first EMM (energy management modules) of the one or more EMMs;

storing the initial energy plan of one or more energy plans at a first edge node of the one or more edge nodes, wherein the one or more workload applications is deployed;

monitoring, by a first EMM, subsequent energy characteristics of a first node;

creating, by the first EMM, a subsequent energy plan of one or more energy plans associated with the first node, wherein the one or more energy plans consisting of energy requirements for each hardware component associated with each of the one or more edge nodes and the one or more workload applications that is deployed across the edge environments;

managing, by the first EMM, the power optimization across the first edge node of the one or more edge nodes based on the subsequent energy plan of one or more energy plans and the one or more energy policies; and dynamically updating, the subsequent energy plan of one or more energy plans based on changes to energy consumptions and subsequent energy characteristics associated with the first node, wherein the one or more energy plans contains one or more energy models and one or more models have been trained to save power.

9. The computer program product of claim 8, further comprising:

monitoring, by a second EMM, a second energy characteristics of a second edge node;

creating, by the second EMM, a second energy plan of one or more energy plans associated with the second edge node;

managing, by the second EMM, the power optimization across the second edge node of the one or more edge nodes based on the second energy plan of one or more energy plans; and updating, the second energy plan of one or more energy plans based on changes to second energy consumptions and the second energy characteristics associated with the second edge node.

10. The computer program product of claim 8, wherein the one or more EMMS is configured to utilize energy characteristics and communicate with other EMMS of the one or more EMMs to ensure effective energy management.

11. The computer program product of claim 8, wherein the initial energy characteristics is an electrical requirement for each hardware, application and edge node components deployed across the edge environments.

12. The computer program product of claim 8, wherein the one or more workload application is an end solution associated with one or more software applications to be deployed on the one or more edge nodes.

13. The computer program product of claim 8, wherein the one or more energy policies further comprises one or more energy algorithm and the one or more energy policies provide guidance for the one or more EMMs to take action, wherein the action includes turning off or changing different energy consumption mode if running low on power.

14. The computer program product of claim 13, wherein the one or more energy algorithm further comprises of utilizing a CPU instead of GPU for inferencing and reducing the input for a training a model to save power.

15. A computer system for power optimization across edge components in an edge environment, wherein the edge environment comprise of one or more edge nodes, the computer system comprising:

one or more computer processors;

one or more computer readable storage media; and one or more computer readable storage media having computer-readable program instructions stored on the one or more computer readable storage media for execution by at least one of the one or more computer processors, the program instructions executes a computer-implemented method comprising steps of:

receiving, by an EDM (Edge Deployment Manager), an initial request associated with a deployment of one or more services and/or one or more workload applications and one or more energy policies, wherein the EDM is configured to monitor and manage requests across one or more edge nodes;

determining, by the EDM, whether to fulfil the initial request or send the initial request to a LDM (localized deployment manager), wherein the LDM is configured to manage deployment of the one or more workload applications and the LDM is assigned to one or more edge locations and the LDM is configured to communicate with the EDM, one or more EMMs (energy management module) to ensure an effective energy management of workload;

in responsive to having determined to send the initial request to the LDM, sending, by the EDM, the initial request to the LDM;

determining, by the LDM, an initial energy characteristics and initial energy consumptions across edge environments, wherein edge environments comprise of the one or more edge locations;

creating an initial energy plan of one or more energy plans, by the LDM, based on the initial energy characteristics, initial energy consumptions and inputs from a first EMM (energy management modules) of the one or more EMMs;

storing the initial energy plan of one or more energy plans at a first edge node of the one or more edge nodes, wherein the one or more workload applications is deployed;

monitoring, by a first EMM, subsequent energy characteristics of a first node;

creating, by the first EMM, a subsequent energy plan of one or more energy plans associated with the first node, wherein the one or more energy plans consisting of energy requirements for each hardware component associated with each of the one or more edge nodes and the one or more workload applications that is deployed across the edge environments;

managing, by the first EMM, the power optimization across the first edge node of the one or more edge nodes based on the subsequent energy plan of one or more energy plans and the one or more energy policies; and dynamically updating, the subsequent energy plan of one or more energy plans based on changes to energy consumptions and subsequent energy characteristics associated with the first node, wherein the one or more energy plans contains one or more energy models and one or more models have been trained to save power.

16. The computer system of claim 15, further comprising:

monitoring, by a second EMM, a second energy characteristics of a second edge node;

creating, by the second EMM, a second energy plan of one or more energy plans associated with the second edge node;

managing, by the second EMM, the power optimization across the second edge node of the one or more edge nodes based on the second energy plan of one or more energy plans; and updating, the second energy plan of one or more energy plans based on changes to second energy consumptions and the second energy characteristics associated with the second edge node.

17. The computer system of claim 15, wherein the one or more EMMS is configured to utilize energy characteristics and communicate with other EMMS of the one or more EMMs to ensure effective energy management.

18. The computer system of claim 15, wherein the initial energy characteristics is an electrical requirement for each hardware, application and edge node components deployed across the edge environments.

19. The computer system of claim 15, wherein the one or more workload application is an end solution associated with one or more software applications to be deployed on the one or more edge nodes.

20. The computer system of claim 15, wherein the one or more energy policies further comprises one or more energy algorithm and the one or more energy policies provide guidance for the one or more EMMs to take action, wherein the action includes turning off or changing different energy consumption mode if running low on power and wherein the one or more energy algorithm further comprises of utilizing a CPU instead of GPU for inferencing and reducing the input for a training a model to save power.

* * * * *